(12) United States Patent
Thompson et al.

(10) Patent No.: US 10,926,114 B2
(45) Date of Patent: Feb. 23, 2021

(54) REMOVABLE BATTERY CARTRIDGE FOR FACEMASK

(71) Applicant: 3Scott Technologies, Inc., Monroe, NC (US)

(72) Inventors: Darin Kyle Thompson, Huntersville, NC (US); Eric James Bassani, Denver, NC (US); Graham Peter Wilson, Flint (GB); Carl Estcourt Tucker, Old Colwyn (GB)

(73) Assignee: Scott Technologies, Inc., Monroe, NC (US)

( * ) Notice: Subject to any disclaimer, the term of this patent is extended or adjusted under 35 U.S.C. 154(b) by 228 days.

(21) Appl. No.: 16/093,296

(22) PCT Filed: Apr. 14, 2017

(86) PCT No.: PCT/US2017/027547
§ 371 (c)(1),
(2) Date: Oct. 12, 2018

(87) PCT Pub. No.: WO2017/180951
PCT Pub. Date: Oct. 19, 2017

(65) Prior Publication Data
US 2019/0118007 A1 Apr. 25, 2019

Related U.S. Application Data

(60) Provisional application No. 62/322,936, filed on Apr. 15, 2016.

(51) Int. Cl.
*A62B 18/02* (2006.01)
*A62B 18/08* (2006.01)
(Continued)

(52) U.S. Cl.
CPC .......... *A62B 18/02* (2013.01); *A41D 13/1161* (2013.01); *A62B 18/08* (2013.01);
(Continued)

(58) Field of Classification Search
CPC ....... A62B 18/00; A62B 18/02; A62B 18/025; A62B 18/04; A62B 18/045; A62B 18/08;
(Continued)

(56) References Cited

U.S. PATENT DOCUMENTS 3,238,535 A * 3/1966 Richey ...................... A61F 9/06
2/8.1
4,595,003 A 6/1986 Shoemaker
(Continued)

FOREIGN PATENT DOCUMENTS

CN 2321479 Y 6/1999
CN 205108058 U 3/2016
(Continued)

OTHER PUBLICATIONS

"Total TPE Solutions—Overmolding Guide", GLS Total TPE Solutions, presented on Dec. 31, 2004, [retrieved from the internet on Dec. 3, 2018], URL <http://www.polyone.com/files/resources/overmolddesignguide.pdf>, 18 pages.
(Continued)

*Primary Examiner* — Joseph D. Boecker

(57) ABSTRACT

A power supply for an item of personal protective equipment and a method and system for removably coupling the power supply to the item of personal protective equipment, such as a respirator mask. The removable battery cartridge is attached to the mask body in the user's chin area, below the location at which a respirator would be or is attached. Thus, the power supply (battery cartridge) is out of the user's way and is at a location that allow the user to couple or uncouple the cartridge from the mask quickly and easily, even when (Continued)

the user is wearing gloves. In one embodiment, a mask body includes a lower surface and power supply that is removably couplable to the mask body lower surface.

20 Claims, 3 Drawing Sheets

(51) Int. Cl.
*H01M 2/10* (2006.01)
*A41D 13/11* (2006.01)
*A44B 11/00* (2006.01)

(52) U.S. Cl.
CPC ......... *A62B 18/084* (2013.01); *H01M 2/1022* (2013.01); *A44B 11/006* (2013.01); *H01M 2220/30* (2013.01)

(58) Field of Classification Search
CPC ......... A62B 18/084; A62B 23/02; A42B 3/28; A42B 3/286; A42B 3/288; A61M 16/06; A61M 2205/8206; H01M 2/1022; H01M 2220/30
See application file for complete search history.

(56) References Cited

U.S. PATENT DOCUMENTS

| | | | | |
|---|---|---|---|---|
| 5,031,237 | A * | 7/1991 | Honrud | A61F 9/068 |
| | | | | 128/201.25 |
| 5,224,473 | A * | 7/1993 | Bloomfield | A62B 18/08 |
| | | | | 128/201.19 |
| 5,934,762 | A | 8/1999 | Vrignaud | |
| 6,168,881 | B1 * | 1/2001 | Fischer | B25F 5/02 |
| | | | | 292/219 |
| 2002/0069871 | A1 | 6/2002 | Palazzotto | |
| 2002/0092522 | A1 | 7/2002 | Fabin | |
| 2003/0234018 | A1 | 12/2003 | Haston | |
| 2004/0058231 | A1 * | 3/2004 | Takeshita | H01M 2/1066 |
| | | | | 429/123 |
| 2006/0076012 | A1 * | 4/2006 | Tanizawa | A62B 18/006 |
| | | | | 128/201.25 |
| 2010/0132721 | A1 * | 6/2010 | Ivory | A42B 3/166 |
| | | | | 128/864 |
| 2010/0224190 | A1 * | 9/2010 | Tilley | A62B 18/006 |
| | | | | 128/204.21 |
| 2010/0258133 | A1 | 10/2010 | Todd | |
| 2012/0125341 | A1 | 5/2012 | Gebrewold | |
| 2013/0087151 | A1 * | 4/2013 | Klockseth | A62B 7/10 |
| | | | | 128/206.15 |
| 2013/0255693 | A1 | 10/2013 | Depel | |
| 2015/0034080 | A1 * | 2/2015 | Furuichi | A62B 18/02 |
| | | | | 128/201.19 |
| 2015/0112883 | A1 | 4/2015 | Orduna | |
| 2015/0283349 | A1 | 10/2015 | McLaren | |
| 2015/0290039 | A1 * | 10/2015 | McCulloch | A42B 3/24 |
| | | | | 2/439 |
| 2016/0001111 | A1 | 1/2016 | Morgan | |
| 2017/0049978 | A1 * | 2/2017 | Berg | A61M 16/0084 |
| 2018/0242679 | A1 * | 8/2018 | Johnstone | A62B 18/003 |

FOREIGN PATENT DOCUMENTS

| | | | |
|---|---|---|---|
| EP | 2486959 | 8/2012 | |
| EP | 2851832 | 3/2015 | |
| FR | 2764517 | 12/1998 | |
| WO | WO 1994/05372 | 3/1994 | |
| WO | WO 2009-067583 | 5/2009 | |
| WO | WO 2011/115754 | 9/2010 | |
| WO | WO 2012-003132 | 1/2012 | |
| WO | WO 2015-084255 | 6/2015 | |
| WO | WO 2015-167098 | 11/2015 | |
| WO | WO-2015167098 A1 * | 11/2015 | ........... A62B 18/003 |
| WO | WO 2017-032981 | 3/2017 | |
| WO | WO 2017-180940 | 10/2017 | |
| WO | WO 2017-181064 | 10/2017 | |

OTHER PUBLICATIONS

International Search Report for PCT International Application No. PCT/US2017/027547, dated Oct. 10, 2017, 6 pages.

* cited by examiner

REMOVABLE BATTERY CARTRIDGE FOR FACEMASK

CROSS REFERENCE TO RELATED APPLICATIONS

This application is a national stage filing under 35 U.S.C. 371 of PCT/US2017/27547, filed Apr. 14, 2017, which claims the benefit of U.S. Provisional Patent Application No. 62/322,936, filed Apr. 15, 2016, the disclosures of which are incorporated by reference in their entirety herein.

TECHNICAL FIELD

A removable battery cartridge, a respirator mask and method and, in particular, to a respirator mask that includes the removable battery cartridge.

BACKGROUND

Personal protective equipment masks, such as respirator masks are used in environments where individuals are exposed to hazardous materials, such as gases, vapors, aerosols (e.g., dusts, mists, and/or biological agents), and/or the like. Respirator masks come in a large variety of types and sizes, ranging from cheaper, disposable masks to higher cost, reusable masks that include replaceable filtration cartridges. Many respirator masks include electronic components, such communications and data transfer equipment, and these electronic components require a power supply for operation.

Currently known power supplies can be bulky, awkward or difficult to attach to the mask, and are not easily attached to or removed from the mask for replacement or recharging. In currently known systems, the power supply is attached to the top of the mask (such as on the user's head), on the cheek or side area of the mask, or even wired to the mask and worn on the user's back or belt. However, in these locations the power supply adds bulk to the mask and may hinder the user's movement. Additionally, currently known power supplies are difficult to couple and uncouple from the mask, as is required for replacement or recharging of the power supply.

SUMMARY

Some embodiments advantageously provide a removable battery cartridge for a respirator mask, a respirator mask having a removable battery cartridge, and a method of attaching the removable battery cartridge to the respirator mask. The removable battery cartridge is attached to the mask body at the chin area. Thus, the power supply (removable battery cartridge) is out of the user's way and is at a location that allows the user to couple or uncouple the cartridge from the mask quickly and easily, even when the user is wearing gloves.

In one embodiment, a respirator mask includes a mask body including a housing portion and a power supply that is removably couplable to the mask body housing portion.

In one aspect of the embodiment, the power supply is a battery cartridge, the mask further comprising a faceplate coupled to the mask body, the faceplate defining an aperture, the battery cartridge being a predetermined vertical distance from the aperture. In one aspect of the embodiment, the power supply is a battery cartridge, the mask body defining a recess sized and configured to receive at least a portion of the battery cartridge. In one aspect of the embodiment, the mask body housing portion has a first surface and a second surface orthogonal to the first surface, the battery cartridge including an edge that is coplanar with the second surface of the mask body housing portion when the battery cartridge is coupled to the mask body.

In one aspect of the embodiment, the battery cartridge further includes a surface that is coplanar with the first surface of the mask body housing portion when the battery cartridge is attached to the mask body.

In one aspect of the embodiment, the battery cartridge edge is a fourth edge, the battery cartridge further including a first edge, and a second edge opposite the first edge, and a third edge opposite the fourth edge, the recess including: a recess first wall configured to be in contact with the battery cartridge first edge when the battery cartridge is attached to mask body; a recess second wall configured to be in contact with the battery cartridge second edge when the battery cartridge is attached to the mask body; and a notch in the recess first wall.

In one aspect of the embodiment, the battery cartridge further includes a protrusion on the battery cartridge first edge, the protrusion being sized and configured to be received within the notch in the recess first wall when the battery cartridge is attached to the mask body.

In one aspect of the embodiment, the battery cartridge further includes an electrical connector in the battery cartridge third edge.

In one aspect of the embodiment, the battery cartridge further includes a screw boss on the battery cartridge second edge and a screw recess extending along the battery cartridge second edge, the screw boss and screw recess each being sized and configured to receive a screw.

In one aspect of the embodiment, the battery cartridge further includes a latch mechanism on the battery cartridge second edge. In one aspect of the embodiment, the mask body further includes a release mechanism in mechanical communication with the latch mechanism, activation of the release mechanism being configured to detach the battery cartridge second edge from the mask body.

In one aspect of the embodiment, the release mechanism is linearly movable along the mask body.

In one aspect of the embodiment, the latch mechanism includes a depressible protrusion and a spring.

In one aspect of the embodiment, the depressible protrusion is engaged with the recess second wall when the latch mechanism is in a first position and the depressible protrusion is disengaged with the recess second wall when the latch mechanism is in a second position.

In one aspect of the embodiment, activation of the release mechanism causes linear movement of the depressible protrusion against the spring and away from the recess second wall.

In one embodiment, a respirator mask includes: a mask body including: a first surface; a second surface orthogonal to the mask body first surface, the mask body first surface defining an aperture sized and configured to receive a respirator; and a recess in the mask body, the recess having a recess first wall, a recess second wall opposite the first wall, and a recess third wall extending between the recess first and second walls, and a recess fourth wall being bordered by the recess first, second, and third walls, the recess fourth wall being parallel to the mask body first surface; and a battery cartridge removably coupled to the mask body, the battery cartridge including: a battery cartridge first edge configured to be in contact with the recess first wall when the battery cartridge is coupled to the mask body; a battery cartridge second edge opposite the battery cartridge first edge, the battery cartridge second edge being configured to be in contact with the recess second wall when the battery cartridge is coupled to the mask body; a battery cartridge first surface extending between the battery cartridge first and second edges, the battery cartridge first surface being configured to be in contact with the recess fourth wall when the battery cartridge is coupled to the mask body; and a battery cartridge second surface extending between the battery cartridge first and second edges, the cartridge second surface being configured to be coplanar with the mask body first surface when the battery cartridge is coupled to the mask body.

In one aspect of the embodiment, the recess further includes a notch in the recess first wall, the battery cartridge further including a protrusion on the battery cartridge first edge, the protrusion being sized and configured to be received within the notch when the battery cartridge is attached to the mask body. In one aspect of the embodiment, the battery cartridge further includes a latch mechanism on the battery cartridge second edge and a release mechanism in mechanical communication with the latch mechanism, activation of the release mechanism causing the battery cartridge to disengage from the recess.

In one embodiment, a removable battery cartridge for a respirator mask, the respirator mask having a first surface and a second surface orthogonal to the first surface, includes: a first edge; a second edge opposite the first edge; a first surface extending between the first and second edges; a second surface extending between the first and second edges and opposite the first surface, the second surface being configured to be coplanar with the mask first surface when the battery cartridge is coupled to the mask body; and a latch mechanism engageable with the mask body. In one aspect of the embodiment, the battery cartridge further includes: third edge extending between the first and second edges; a fourth edge opposite the third edge and extending between the first and second edges, the fourth edge being configured to be coplanar with the mask second surface when the battery cartridge is coupled to the mask body.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

The invention advantageously provides a removable power supply and a respirator mask having a removable power supply, such as a removable battery cartridge that is easily attached and detached from the mask.

Before describing in detail exemplary embodiments that are in accordance with the disclosure, it is noted that components have been represented where appropriate by convention symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
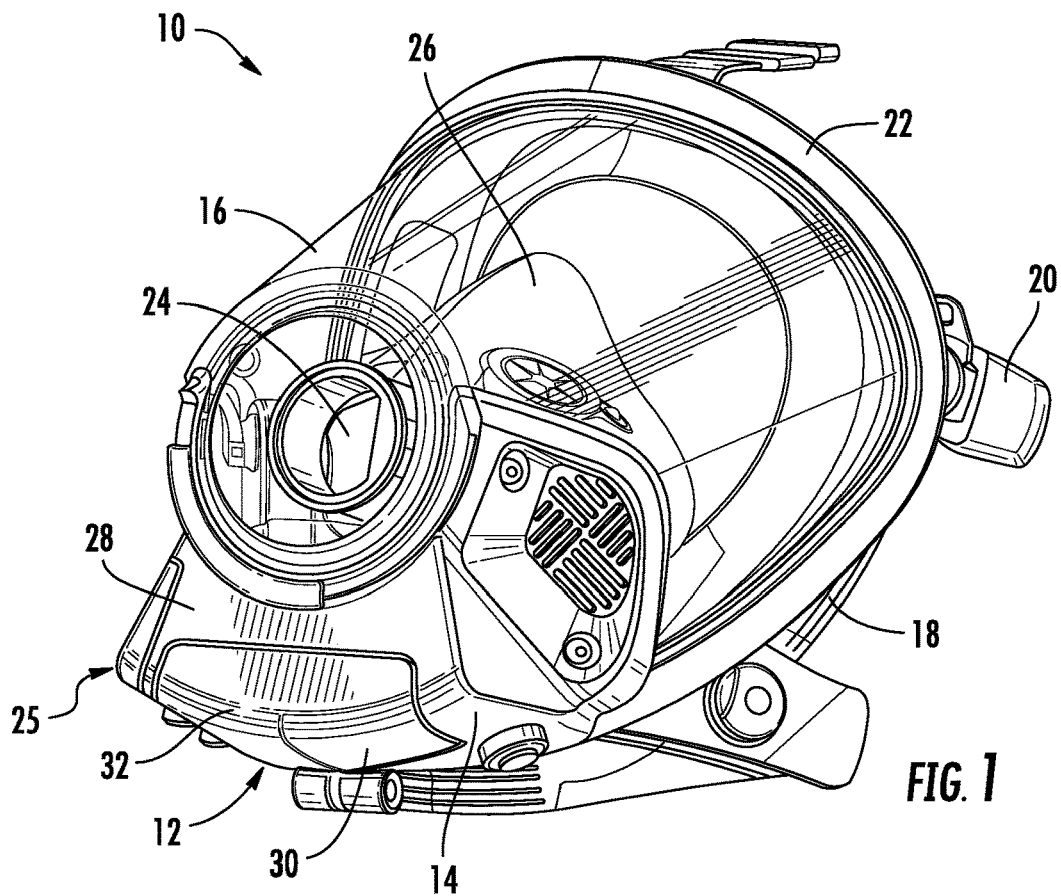
FIG. 1 shows an exemplary respirator mask having a removable battery cartridge.

Referring now to the drawing figures in which like reference designations refer to like elements, an embodiment of an item of personal protective equipment having a removable battery cartridge constructed in accordance with the principles of the invention is shown in the figures and generally designated as "10." Referring to FIG. 1, the item of personal protective equipment is a respirator mask 10 configured to be worn by a user in environments where the user is exposed to hazardous materials, such as, but not limited to, gases, vapors, aerosols (such as dusts, mists, and/or biological agents), and/or the like. In addition to a battery cartridge 12 discussed in greater detail below, the mask 10 also generally includes a body 14, a faceplate or fenestra 16 coupled to the body 14, a face seal 18 coupled to the body 14 and having one or more straps 20, a bezel 22, an aperture 24 in the faceplate 16 sized and configured for attachment to a respirator (not shown), and a nosecup 26 in communication with the aperture 24. The mask 10 may also include other components, depending on the conditions and purpose for which the mask 10 is used.

The battery cartridge 12 is removably couplable to the mask body 14. In one embodiment, the battery cartridge 12 is configured to be coupled to the mask body 14 at a predetermined distance from the aperture 24, such as on a housing portion 25 beneath the aperture 24 (and respirator, when attached) in an area proximate a user's chin when the mask 10 is worn by the user. In some embodiments, the housing portion 25 houses or contains electronics components of the system, such as microphones, transceivers, wireless communications units, or the like. In this location, the battery cartridge 12 does not hinder the user's movement, does not add bulk to the mask, and is easily accessible for attachment or removal from the mask.

The battery cartridge 12 may be composed of the same material(s) as the mask body 14, such as a rigid plastic like high-density polyethylene (HDPE). Optionally, the mask body 14 and/or the battery cartridge 12 may be overmolded with or include additional materials having a lower durometer, such as silicone rubber, thermoplastic elastomer (TPE), rubber (either natural or synthetic), and/or other material. However, it will be understood that the mask body 14 and battery cartridge 12 should be rigid enough to maintain their shape when the battery cartridge 12 is attached and detached from the mask 10. In the embodiment shown in FIGS. 1-3, the housing portion 25 of the mask body 14 defines a first (or front) surface 28 and a second (or lower) surface 30 of the mask 10, with the first surface 28 being orthogonal to the second surface 30. Put another way, the first 28 and second 30 surfaces may meet to define a lower edge 32 of the mask body 14. As used herein, the term "orthogonal" includes not only surfaces that meet at a 90° angle, but also those surfaces that lie in planes that meet at a 90° angle, regardless of whether the surfaces transition into each other at a rounded edge or meet at a sharp edge. Further, the term "orthogonal" as used herein also includes surfaces that are generally orthogonal to each other within an acceptable tolerance, such as within ±10°. The lower edge 32 may be rounded, or it may have another configuration. Even if the lower edge 32 is rounded (and even if the first 28 and/or second 30 surfaces are not flat, have textural features, or the like), the first surface 28 is said to be at least substantially orthogonal to the second surface 30, as the plane in which the first surface 28 lies is at least substantially orthogonal to the plane in which the second surface 30 lies. When the mask 10 is worn by a user, the first surface 28 generally extends from the user's chin to the user's forehead, and the second surface 30 generally extends from the user's chin to the user's neck. The first surface 28 at least partially encircles or follows a lower curve of the faceplate aperture 22.

Figure 5:
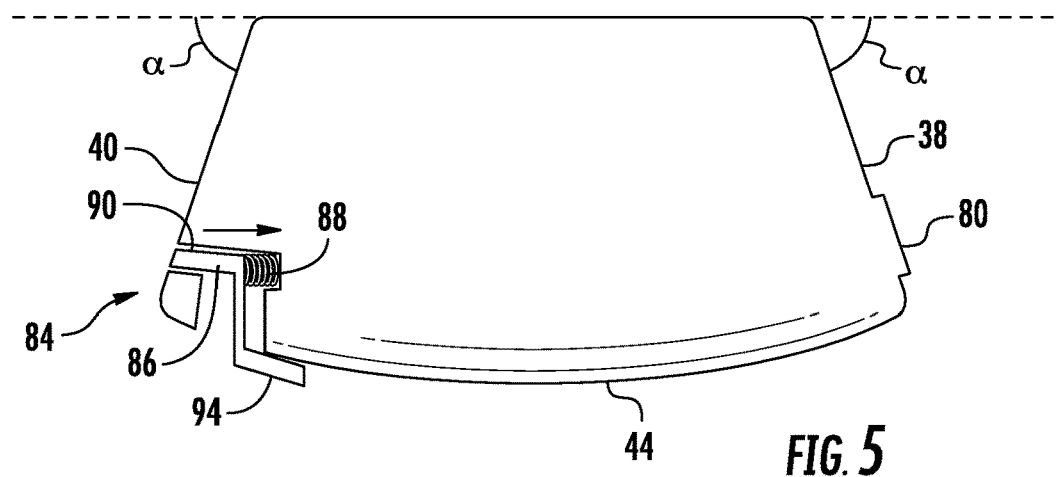
FIG. 5 shows a cross-sectional view of a removable battery cartridge having a latch mechanism.

In one embodiment, the battery cartridge 12 has an approximately rectangular or trapezoidal shape, with four edges and two surfaces. For example, the cartridge 12 includes a first edge 38 and a second edge 40 opposite the first edge 38. In some embodiments, the first 38 and second 40 edges may be parallel; however, in the embodiment shown in FIGS. 1-3, the first 38 and second 40 edges may be canted relative to each other, similar to the angled opposite sides of a trapezoid. As a non-limiting example, the battery cartridge 12 also includes a third edge 42 that extends between the first 38 and second 40 edges, and each of the first 38 and second 40 edges may meet the third edge 42 at an angle α from horizontal of between approximately 10° and approximately 40°, depending on the type, size, and configuration of the mask to which the battery cartridge 12 is attached (for example, as shown in FIG. 5). The battery cartridge 12 also includes a fourth 44 edge opposite the third edge 42. Whereas the third edge 42 is flat, in one embodiment the fourth edge 44 is curved (for example, curved away from the third edge 42). However, it will be understood that the fourth edge 44 may have any shape that allows the battery cartridge 12 to coplanar with the mask body second surface 30. That is, the cartridge fourth edge 44 and the mask body second surface 30 may define a continuous surface when the battery cartridge 12 is coupled to the mask body 14. As used herein, the term "coplanar" includes not only entirely coplanar surfaces having a smooth surface with no discernible boundary between the surfaces, but also surfaces that are irregularly shaped but lie in a common plane and surfaces that are coplanar within an acceptable tolerance.

The battery cartridge 12 includes a first surface 46 and a second surface 48 opposite the first surface 46. Each of the first 46 and second 48 surfaces may be bound by the first 38, second 40, third 42, and fourth 44 edges. Whereas the first surface 46 is flat, the second surface 48 may have any shape that allows the battery cartridge 12 to be at substantially coplanar with the mask body first surface 28. That is, the cartridge second surface 48 and the mask body first surface 28 may define a continuous surface when the battery cartridge 12 is coupled to the mask body 14. Further, the curved transition between the cartridge second surface 48 and the cartridge fourth edge 44, or the edge at which the cartridge second surface 48 and cartridge fourth edge 44 meet, defines at least a portion of the mask lower edge 32. Likewise, the curved transition between the mask body first surface 28 and the mask body second surface 30, or the edge at which the mask body first surface 28 and mask body second surface 30 meet, also defines at least a portion of the mask lower edge 32 on either side of the recess 50 or battery cartridge 12.

The mask body 14 further includes or defines a recess 50 that is sized and configured to receive at least a portion of the battery cartridge 12. Specifically, the recess 50 is defined or included in the mask body housing portion 25, with the recess 50 being a recess in at least a portion of each of the first 28 and second 30 surfaces of the mask body. In one embodiment, the recess 50 is sized and configured to surround the battery cartridge 12 on the first 38, second 40, and third 42 edges and the first surface 46, with at least a portion of each of the fourth edge 44 and second surface 48 being exposed. For example, the fourth edge 44 and second surface 48 may be entirely exposed and coplanar with each of the mask body second surface 30 and the mask body first surface 28, respectively. In this configuration, the recess 50 includes or defines a first wall 54 (or first side wall), a second wall 56 (or second side wall) opposite the first wall 54, a third wall 58 (or ceiling) extending between the first 54 and second 56 walls, and a fourth wall 60 (or back wall) extending between and being bordered by the first 54, second 56, and third 58 walls. The fourth wall 60 is parallel to the mask first surface 28. As used herein, the term "parallel" includes not only surfaces that are parallel within a 0° tolerance, but also those surfaces that lie in planes that are generally parallel to each other within an acceptable tolerance, such as within ±5°. When the battery cartridge 12 is coupled to the mask 10, the first edge 38 of the battery cartridge 12 is in contact with the recess first wall 54, the second edge 40 of the battery cartridge 12 is in contact with the recess second wall 56, the third edge 42 of the battery cartridge 12 is in contact with the recess third wall 58, and the first surface 46 of the battery cartridge 12 is in contact with the recess fourth wall 60.

The battery cartridge 12 is a housing that includes a power source 66 therein that is capable of operating the electronic components of the respirator mask for a predetermined period of time. For example, the power source 66 may include one or more batteries (such as AA or AAA batteries) and/or a rechargeable cell of one or more batteries (such as one to eight batteries). Non-limiting examples of batteries and/or rechargeable cell include without limitation alkaline, nickel metal hydride (NiMH), lithium ion (Li-ion), and/or the like. The battery cartridge 12 includes an electrical connector 68 to transfer power from the power source 66 to the electrical components of the mask. Accordingly, the mask body 14 includes a corresponding electrical connector that is mateable to or engageable with the electrical connector 68 of the battery cartridge 12. In one embodiment, the battery cartridge 12 includes a first electrical connector 68 on the third edge 42 and the mask body 14 includes a corresponding second electrical connector on the third wall 58 (not shown).

Figure 2:
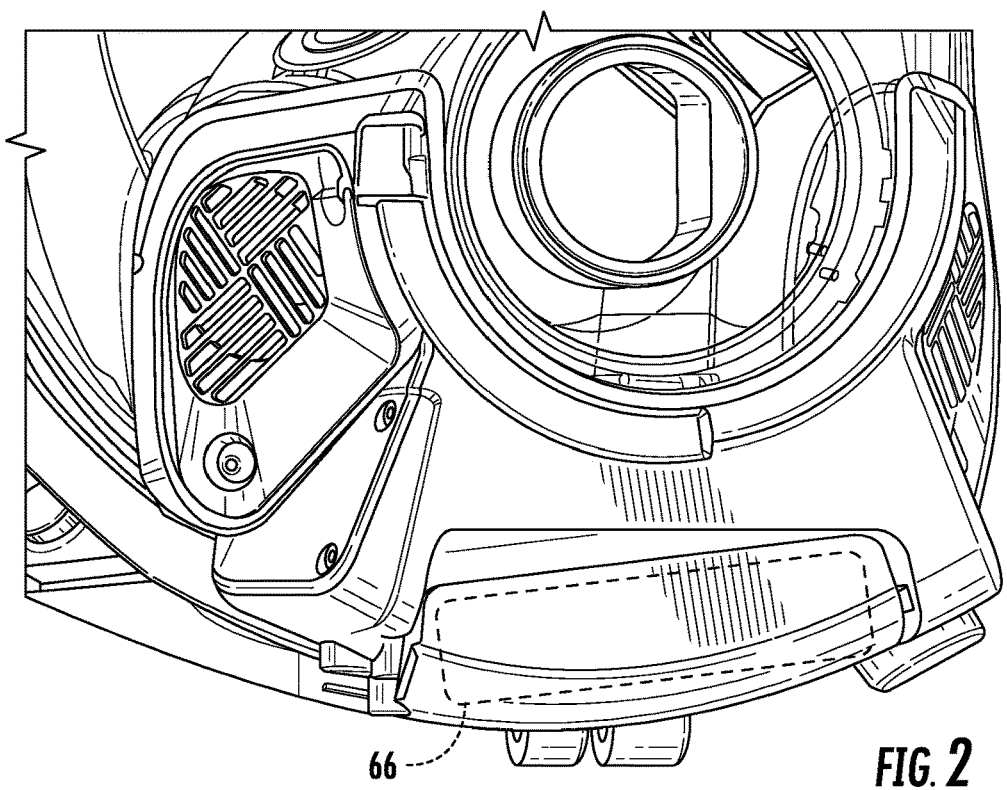
FIG. 2 shows a close-up view of the respirator mask with the removable battery cartridge in a partially detached configuration.
Figure 3:
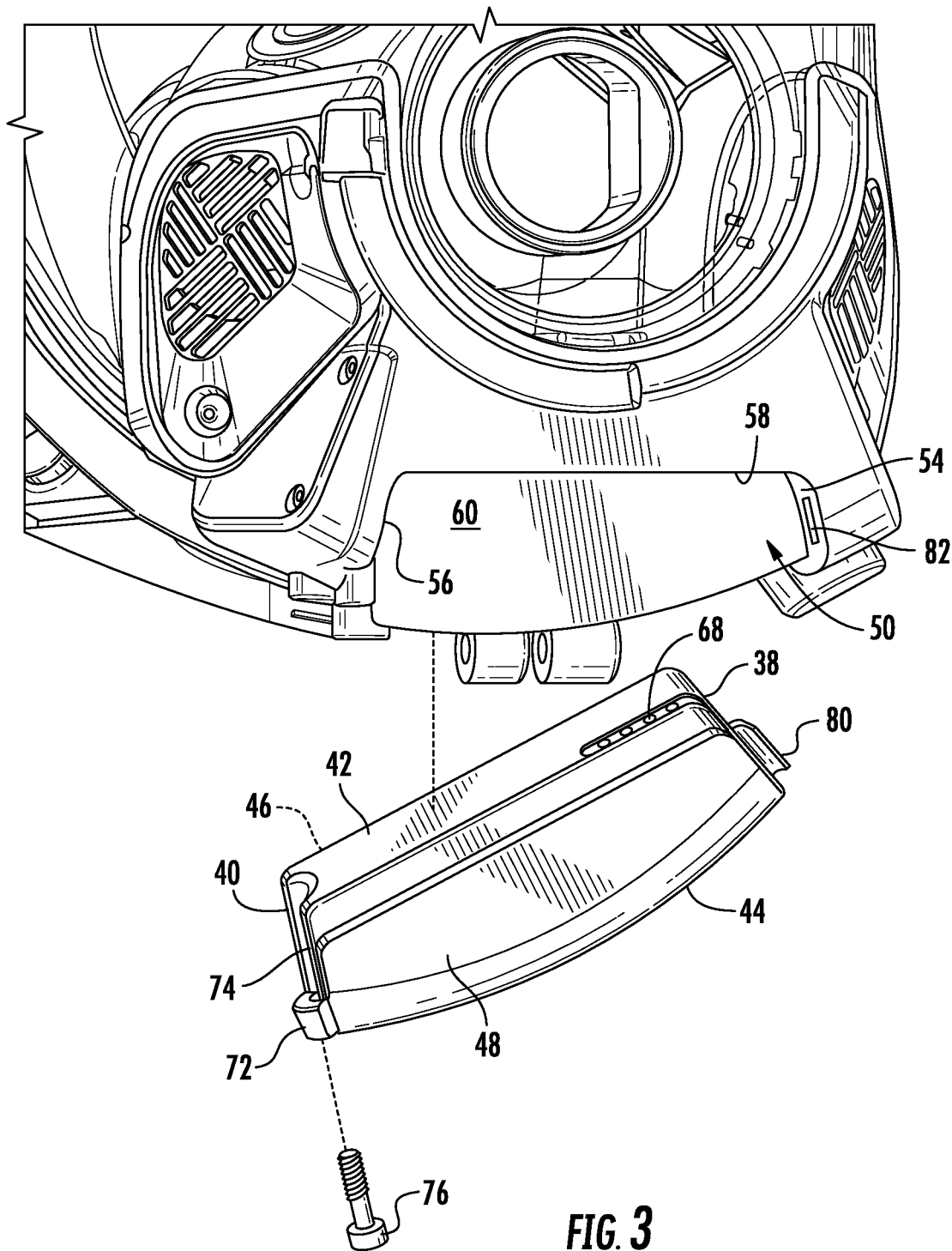
FIG. 3 shows a close-up view of the respirator mask with the removable battery cartridge in a fully detached configuration.
Figure 4:
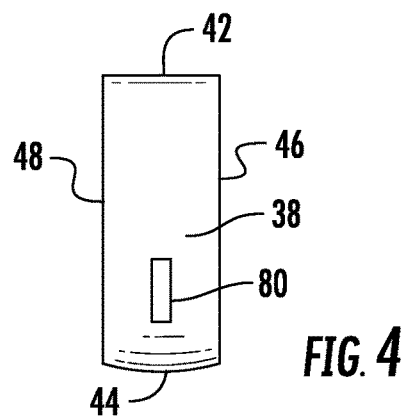
FIG. 4 shows a side view of a removable battery cartridge.

Referring now to FIGS. 2 and 3, the attachment of the battery cartridge 12 to the mask is shown and discussed in more detail. The battery cartridge 12 may be removably couplable or coupled to the mask 10 using any mechanisms or devices known in the art. In one embodiment, such as that shown in FIGS. 2 and 3, the battery cartridge 12 includes a screw boss 72 and at corresponding linear screw recess 74 extending along the cartridge second edge 40. The screw recess 74 has a semi-circular, or at least curved, cross-sectional shape, and the screw boss 72 and screw recess 74 are together configured to receive a screw for coupling the battery cartridge 12 to the mask body 14. For example, the recess third wall 58 may include a threaded hole (not shown). The screw boss 72 and shape of the screw recess 74 guide a screw 76 into the threaded hole, and a user then rotates the screw 76 in a first direction (such as clockwise) in until the screw 76 is tightened against the mask body 14, thereby securely coupling or mounting the battery cartridge 12 to the mask body 14. In one embodiment, the screw 76 is a thumb screw that can be rotated by the user without tools. In another embodiment, the screw 76 is a non-pointed screw, such as a socket screw, hex bolt, machine screw, or the like. In another embodiment, the screw 76 is an elongate quick-release fastener.

To remove the battery cartridge 12, the user rotates the screw 76 in an opposite second direction (such as counter-clockwise) until the screw 76 disengages from the mask body 14 and the battery cartridge 12 is released. FIG. 2 shows the battery cartridge 12 partially uncoupled or removed from the mask body 14 and FIG. 3 shows the battery cartridge 12 fully uncoupled or removed from the mask body 14, with the screw 76 disengaged. Although the screw 76 is show as being uncoupled from the mask 10 in FIG. 3, in one embodiment the screw 76 is retained within the screw boss 72 when the screw 76 is uncoupled from the mask body 14.

To facilitate coupling the battery cartridge 12 to the mask body 14, the battery cartridge 12 also includes a protrusion 80 extending from the cartridge first edge 38. The recess 50 includes a corresponding notch 82 that is sized and configured to accept the protrusion 80. When coupling the battery cartridge 12 to the mask body 14, the protrusion 80 on the cartridge first edge is inserted into the recess notch 82, thereby partially seating the battery cartridge 12 within the recess 50 and aligning the battery cartridge 12 for coupling at the cartridge second edge 40. Once the protrusion 80 is within the notch 82, the cartridge second edge 40 is inserted into the recess 50 and tightens the screw 76, as discussed above.

Figure 6:
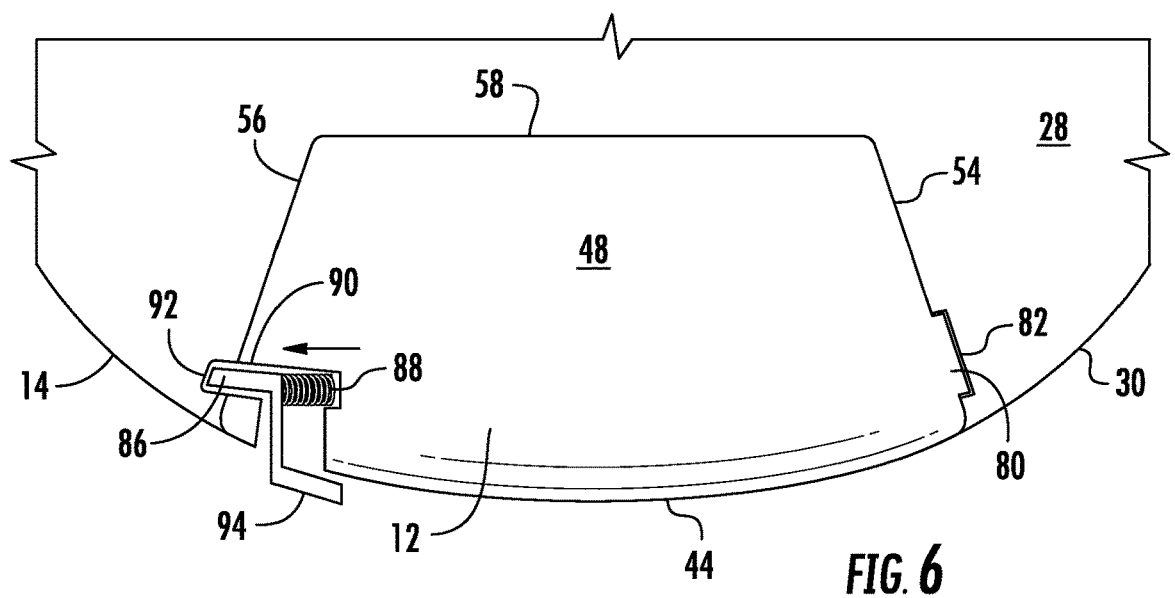

Referring now to FIGS. 5 and 6, a cross-sectional view of a second attachment mechanism is shown. In one embodiment, the battery cartridge 12 may be removably coupled to the mask body 14 using a spring-mounted latch mechanism 84. Similar to the battery cartridge shown in FIGS. 1-4, the battery cartridge 12 shown in FIGS. 5 and 6 also includes a protrusion 80 on the cartridge first edge 38 that is insertable into the corresponding recess notch 82 to facilitate coupling between the battery cartridge 12 and mask 10. The battery cartridge 12 includes a depressible protrusion 86 that is at least partially disposed within and linearly movable within the battery cartridge 12. The battery cartridge 12 further includes a spring 88 coupled to, in contact with, or in communication with the depressible protrusion 86 such that the spring 88 biases movement of the depressible protrusion 86 in a first linear direction and resists movement of the depressible protrusion 86 in a second linear direction opposite the first linear direction. For example, at least a portion of the depressible protrusion 86 extends through an aperture 90 in the cartridge second edge 40 when the spring 88 is uncompressed, and the depressible protrusion 86 is at least substantially located within the battery cartridge 12 when the spring 88 is compressed. The recess second wall 92 includes a corresponding aperture 92 such that at least a portion of the depressible protrusion 86 extends through the aperture 92 when the spring 88 is uncompressed and the battery cartridge 12 is coupled to the mask body 14. In this configuration, the latch mechanism retains the battery cartridge 12 within the recess 50 and the battery cartridge 12 is said to be in the mounted, coupled, or locked position. The battery cartridge 12 further includes a release mechanism 94, such as a finger slide that is linearly movable along an external surface of the mask body 14, that is coupled to or otherwise in mechanical communication with the depressible protrusion 86 and that the user can operate quickly and easily. In one configuration, the user may slide the release mechanism 94 in a first direction to compress the spring 88 and retract the depressible protrusion 86 within the battery cartridge 12 to either couple or uncouple the battery cartridge 12 from the mask body 14. To couple or lock the battery cartridge 12 to the mask, the user may then slide the release mechanism 94 in an opposite second direction, or simply release the release mechanism 94, to allow the spring 88 to decompress, thereby extending the depressible protrusion 86 into the recess aperture 90. That is, the depressible protrusion 86 is engaged with the recess second wall 56 when the latch mechanism 84 is in a first position and the depressible protrusion 86 is disengaged with the recess second wall 56 when the latch mechanism 84 is in a second position. As shown in FIG. 2, activation of the release mechanism 94 causes the battery cartridge second edge 40 to detach from the recess 50. The protrusion 80 on the battery cartridge first edge 38 can then be disengaged from the notch 82 to completely uncouple the battery cartridge 12 from the mask body 14.

It will be understood that other attachment mechanisms may be used in addition to or instead of those shown and described herein. In any configuration, the attachment mechanism(s) allows a user to quickly and easily couple or uncouple the battery cartridge 12, even if the user is wearing gloves. As a non-limiting example, the release mechanism 94 may be a rotational switch, a button, or the like. Additionally, various safety mechanisms may also be included as a second or backup lock to secure the battery cartridge 12 to the mask 10. The safety mechanism(s) may prevent the battery cartridge 12 from being inadvertently released from the mask 10.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In one embodiment, a respirator mask includes a mask body (14) including a housing portion (25) and a power supply (12) that is removably couplable to the mask body housing portion (25).

In one aspect of the embodiment, the power supply (12) is a battery cartridge (12), the mask (10) further comprising a faceplate (16) coupled to the mask body (14), the faceplate (16) defining an aperture (24), the battery cartridge (12) being a predetermined vertical distance from the aperture (24). In one aspect of the embodiment, the power supply (12) is a battery cartridge (12), the mask body (14) defining a recess (50) sized and configured to receive at least a portion of the battery cartridge (12). In one aspect of the embodiment, the mask body housing portion (25) has a first surface (28) and a second surface (30) orthogonal to the first surface (28), the battery cartridge (12) including an edge (44) that is coplanar with the second surface (30) of the mask body housing portion (25) when the battery cartridge (12) is coupled to the mask body (14).

In one aspect of the embodiment, the battery cartridge (12) further includes a surface (46) that is coplanar with the first surface (28) of the mask body housing portion (25) when the battery cartridge (12) is attached to the mask body (14).

In one aspect of the embodiment, the battery cartridge edge (44) is a fourth edge (44), the battery cartridge (12) further including a first edge (38), and a second edge (40) opposite the first edge (38), and a third edge (42) opposite the fourth edge (44), the recess (50) including: a recess first wall (54) configured to be in contact with the battery cartridge first edge (38) when the battery cartridge (12) is attached to mask body (14); a recess second wall (56) configured to be in contact with the battery cartridge second edge (40) when the battery cartridge (12) is attached to the mask body (14); and a notch (82) in the recess first wall (54).

In one aspect of the embodiment, the battery cartridge (12) further includes a protrusion (80) on the battery cartridge first edge (38), the protrusion (80) being sized and configured to be received within the notch (82) in the recess first wall (54) when the battery cartridge (12) is attached to the mask body (14).

In one aspect of the embodiment, the battery cartridge (12) further includes an electrical connector (68) in the battery cartridge third edge (42).

In one aspect of the embodiment, the battery cartridge (12) further includes a screw boss (72) on the battery cartridge second edge (40) and a screw recess (74) extending along the battery cartridge second edge (40), the screw boss (72) and screw recess (74) each being sized and configured to receive a screw (76).

In one aspect of the embodiment, the battery cartridge (12) further includes a latch mechanism (84) on the battery cartridge second edge (40). In one aspect of the embodiment, the mask body (14) further includes a release mechanism (94) in mechanical communication with the latch mechanism (84), activation of the release mechanism (94) being configured to detach the battery cartridge second edge (40) from the mask body (14).

In one aspect of the embodiment, the release mechanism (94) is linearly movable along the mask body (14).

In one aspect of the embodiment, the latch mechanism (84) includes a depressible protrusion (86) and a spring (88).

In one aspect of the embodiment, the depressible protrusion (86) is engaged with the recess second wall (56) when the latch mechanism (84) is in a first position and the depressible protrusion (86) is disengaged with the recess second wall (56) when the latch mechanism (84) is in a second position.

In one aspect of the embodiment, activation of the release mechanism (94) causes linear movement of the depressible protrusion (86) against the spring (88) and away from the recess second wall (56).

In one embodiment, a respirator mask (10) includes: a mask body (14) including: a first surface (28); a second surface (30) orthogonal to the mask body first surface (28), the mask body first surface (28) defining an aperture (24) sized and configured to receive a respirator; and a recess (50) in the mask body (14), the recess (50) having a recess first wall (54), a recess second wall (56) opposite the first wall (54), and a recess third wall (58) extending between the recess first (54) and second (56) walls, and a recess fourth wall (60) being bordered by the recess first (54), second (56), and third walls (58), the recess fourth wall (60) being parallel to the mask body first surface (28); and a battery cartridge (12) removably coupled to the mask body (14), the battery cartridge (12) including: a battery cartridge first edge (38) configured to be in contact with the recess first wall (54) when the battery cartridge (12) is coupled to the mask body (14); a battery cartridge second edge (40) opposite the battery cartridge first edge (38), the battery cartridge second edge (40) being configured to be in contact with the recess second wall (56) when the battery cartridge (12) is coupled to the mask body (14); a battery cartridge first surface (46) extending between the battery cartridge first (38) and second edges (40), the battery cartridge first surface (46) being configured to be in contact with the recess fourth wall (60) when the battery cartridge (12) is coupled to the mask body (14); and a battery cartridge second surface (48) extending between the battery cartridge first (38) and second (40) edges, the cartridge second surface (48) being configured to be coplanar with the mask body first surface (28) when the battery cartridge (12) is coupled to the mask body (14).

In one aspect of the embodiment, the recess (50) further includes a notch (82) in the recess first wall (54), the battery cartridge (12) further including a protrusion (80) on the battery cartridge first edge (38), the protrusion (80) being sized and configured to be received within the notch (82) when the battery cartridge (12) is attached to the mask body (14). In one aspect of the embodiment, the battery cartridge (12) further includes a latch mechanism (84) on the battery cartridge second edge (40) and a release mechanism (94) in mechanical communication with the latch mechanism (84), activation of the release mechanism (94) causing the battery cartridge (12) to disengage from the recess (50).

In one embodiment, a removable battery cartridge (12) for a respirator mask (10), the respirator mask (10) having a first surface (28) and a second surface (30) orthogonal to the first surface (28), includes: a first edge (38); a second edge (40) opposite the first edge (38); a first surface (46) extending between the first (38) and second (40) edges; a second surface (48) extending between the first (38) and second (40) edges and opposite the first surface (46), the second surface (48) being configured to be coplanar with the mask first surface (28) when the battery cartridge (12) is coupled to the mask body (14); and a latch mechanism (84) engageable with the mask body (14).

In one aspect of the embodiment, the battery cartridge (12) further includes: third edge (42) extending between the first (38) and second (40) edges; a fourth edge (44) opposite the third edge (42) and extending between the first (38) and second (40) edges, the fourth edge (44) being configured to be coplanar with the mask second surface (30) when the battery cartridge (12) is coupled to the mask body (14).

Other embodiments may include:

Embodiment 1. Headgear for first responders, comprising: a facepiece; and a battery pack attached to the facepiece, the battery pack removable through hand manipulation.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A respirator mask, comprising:
a mask body including a housing portion; and
a power supply including:
a latch that is removably couplable to the mask body housing portion and;
a release in mechanical communication with the latch, activation of the release being configured to detach the power supply from the mask body.

2. The respirator mask of claim 1, wherein the power supply is a battery cartridge, the mask further comprising a faceplate coupled to the mask body, the faceplate defining an aperture, the battery cartridge being a predetermined vertical distance from the aperture.

3. The respirator mask of claim 2, the mask body defining a recess sized and configured to receive at least a portion of the battery cartridge.

4. The respirator mask of claim 3, wherein the mask body housing portion has a first surface and a second surface orthogonal to the first surface, the battery cartridge including an edge that is coplanar with the second surface of the mask body housing portion when the battery cartridge is coupled to the mask body.

5. The respirator mask of claim 4, wherein the battery cartridge further includes a surface that is coplanar with the first surface of the mask body housing portion when the battery cartridge is attached to the mask body.

6. The respirator mask of claim 4, wherein the battery cartridge edge is a fourth edge, the battery cartridge further including a first edge, and a second edge opposite the first edge, and a third edge opposite the fourth edge, the recess including:
a recess first wall configured to be in contact with the battery cartridge first edge when the battery cartridge is attached to mask body;
a recess second wall configured to be in contact with the battery cartridge second edge when the battery cartridge is attached to the mask body; and a notch in the recess first wall.

7. The respirator mask of claim 6, wherein the battery cartridge further includes a protrusion on the battery cartridge first edge, the protrusion being sized and configured to be received within the notch in the recess first wall when the battery cartridge is attached to the mask body.

8. The respirator mask of claim 6, wherein the battery cartridge further includes an electrical connector in the battery cartridge third edge.

9. The respirator mask of claim 6, wherein the battery cartridge further includes a screw boss on the battery cartridge second edge and a screw recess extending along the battery cartridge second edge, the screw boss and screw recess each being sized and configured to receive a screw.

10. The respirator mask of claim 6, wherein the latch is positioned on the battery cartridge second edge.

11. The respirator mask of claim 10, the activation of the release being configured to detach the battery cartridge second edge from the mask body.

12. The respirator mask of claim 11, wherein the release is linearly movable along the mask body.

13. The respirator mask of claim 11, wherein the latch includes a depressible protrusion and a spring.

14. The respirator mask of claim 13, wherein the depressible protrusion is engaged with the recess second wall when the latch is in a first position and the depressible protrusion is disengaged with the recess second wall when the latch is in a second position.

15. The respirator mask of claim 13, wherein activation of the release causes linear movement of the depressible protrusion against the spring and away from the recess second wall.

16. A respirator mask comprising:
a mask body including:
a first surface;
a second surface orthogonal to the mask body first surface, the mask body first surface defining an aperture sized and configured to receive a respirator; and
a recess in the mask body, the recess having a recess first wall, a recess second wall opposite the first wall, and a recess third wall extending between the recess first and second walls, and a recess fourth wall being bordered by the recess first, second, and third walls, the recess fourth wall being parallel to the mask body first surface; and
a battery cartridge removably coupled to the mask body, the battery cartridge including:
a battery cartridge first edge configured to be in contact with the recess first wall when the battery cartridge is coupled to the mask body;
a battery cartridge second edge opposite the battery cartridge first edge, the battery cartridge second edge being configured to be in contact with the recess second wall when the battery cartridge is coupled to the mask body;
a battery cartridge first surface extending between the battery cartridge first and second edges, the battery cartridge first surface being configured to be in contact with the recess fourth wall when the battery cartridge is coupled to the mask body; and
a battery cartridge second surface extending between the battery cartridge first and second edges, the cartridge second surface being configured to be coplanar with the mask body first surface when the battery cartridge is coupled to the mask body;
a latch that is removably couplable to the mask body; and
a release in mechanical communication with the latch, activation of the release being configured to detach the battery cartridge from the mask body.

17. The respirator mask of claim 16, wherein the recess further includes a notch in the recess first wall, the battery cartridge further including a protrusion on the battery cartridge first edge, the protrusion being sized and configured to be received within the notch when the battery cartridge is attached to the mask body.

18. The respirator mask of claim 17, wherein the battery cartridge further includes the latch on the battery cartridge second edge and the release in mechanical communication with the latch, activation of the release causing the battery cartridge to disengage from the recess.

19. A removable battery cartridge for a respirator mask, the respirator mask having a first surface and a second surface orthogonal to the first surface, the battery cartridge comprising:
a first edge;
a second edge opposite the first edge;
a first surface extending between the first and second edges;
a second surface extending between the first and second edges and opposite the first surface of the battery cartridge, the second surface of the battery cartridge being configured to be coplanar with the mask first surface when the battery cartridge is coupled to the respirator mask;

a latch engageable with the respirator mask; and a release in mechanical communication with the latch, activation of the release being configured to detach the battery cartridge from the respirator mask.

20. The battery cartridge of claim 19, wherein the battery cartridge further comprises:

a third edge extending between the first and second edges;

a fourth edge opposite the third edge and extending between the first and second edges, the fourth edge being configured to be coplanar with the mask second surface when the battery cartridge is coupled to the respirator mask.

\* \* \* \* \*

UNITED STATES PATENT AND TRADEMARK OFFICE
CERTIFICATE OF CORRECTION

PATENT NO. : 10,926,114 B2  Page 1 of 1
APPLICATION NO. : 16/093296
DATED : February 23, 2021
INVENTOR(S) : Darin Kyle Thompson It is certified that error appears in the above-identified patent and that said Letters Patent is hereby corrected as shown below:

On the Title Page

Under "(71) Applicant:"
Delete "3Scott Technologies, Inc." and insert -- "Scott Technologies, Inc." --.

In the Claims

Column 11
Line 12, in Claim 2, delete "body," and insert -- body (14), --, therefor.

Signed and Sealed this
Third Day of August, 2021

Drew Hirshfeld
*Performing the Functions and Duties of the
Under Secretary of Commerce for Intellectual Property and
Director of the United States Patent and Trademark Office*